June 16, 1959

E. W. WERTS 2,891,218

CAPACITY COMPENSATED BRIDGE CIRCUIT

Filed June 7, 1955

INVENTOR.
Everett W. Werts,
BY Schroeder, Hofgren,
Brady & Wegner
Atty's.

United States Patent Office 2,891,218
Patented June 16, 1959

2,891,218

CAPACITY COMPENSATED BRIDGE CIRCUIT

Everett W. Werts, Michigan City, Ind., assignor, by mesne assignments, to Dunham-Bush, Inc., West Hartford, Conn., a corporation of Connecticut Application June 7, 1955, Serial No. 513,820

5 Claims. (Cl. 324—62)

The invention relates generally to an electrical bridge circuit and more particularly to such a bridge circuit used for measurement and control and with alternating current.

In many installations employing bridge circuits one or more elements of the bridge circuit are remotely located. An example is found in circuits employed for measuring and controlling temperature in dwelling units supplied with heat from a common and centrally located heating plant. Under those circumstances, the unit of space to be heated may be located several floors and sometimes as much as several blocks from the heating plant. With an element of the bridge circuit such as a resistance thermostat located thus remotely from the basic bridge assembly, the electrical values introduced by the long leads are factors that would completely disrupt the proper operation of the bridge circuit unless compensated for.

In the past direct current has been employed and hence only the resistance of the leads had to be compensated for or balanced inasmuch as capacitance and inductance were not factors. The problem was therefore solved by the use of a three or four-wire resistance compensating lead arrangement. Direct current, however, has the disadvantage that it is not as adaptable to amplification by electronic methods as alternating current and frequently is not available. The employment of alternating current, however, introduces the additional bridge unbalancing factors of capacitance and inductance. At the comparatively low frequencies of lighting and power circuits, the inductance factor is negligible. The capacitance factor, however, is definitely troublesome because it is of significant magnitude and extends throughout the system between adjacent leads, between the leads and ground, and so forth.

With a bridge circuit employing alternating current definitely inoperative unless the capacitance factor is compensated for, an attempt has been made to attain that end by incorporating in the bridge circuits a capacity balance adjustment. This has added to the cost of the circuit and has not proved satisfactory from the operational standpoint because to make the proper setting of the capacity balance adjustment requires the coordinated manipulation of both the capacity balance adjustment and the resistance balance adjustment. To make these adjustments requires special technical knowledge and skill not usually possessed by an electrician.

It is an object of this invention, therefore, to provide a new and improved bridge circuit, having a remotely located element, which will give proper readings and operation even though the current employed is alternating current.

Another and more particular object is to provide an alternating current bridge circuit in which the capacitance of the leads is compensated for in a simple yet effective manner.

A further object is to provide an alternating current bridge circuit, having a remotely located element, so arranged and designed that the null balance point is not affected by either the resistance or the capacity of the lead wires connecting the element in the circuit.

Yet another object is to provide an alternating current bridge circuit, having a remotely located element, in which the effect of inter-conductor and conductor-to-ground capacity is balanced out without the need for balance introducing elements other than those employed to balance resistance.

Still another object is to provide an arrangement of impedance arms and lead wires in an alternating current bridge circuit having a remotely located element, which arrangement compensates for reactance unbalance introduced by the leads themselves without the need for balance introducing elements other than those employed to balance resistance.

Other objects and advantages will become apparent from the following detailed description taken in connection with the accompanying drawings, in which.

Figure 1:
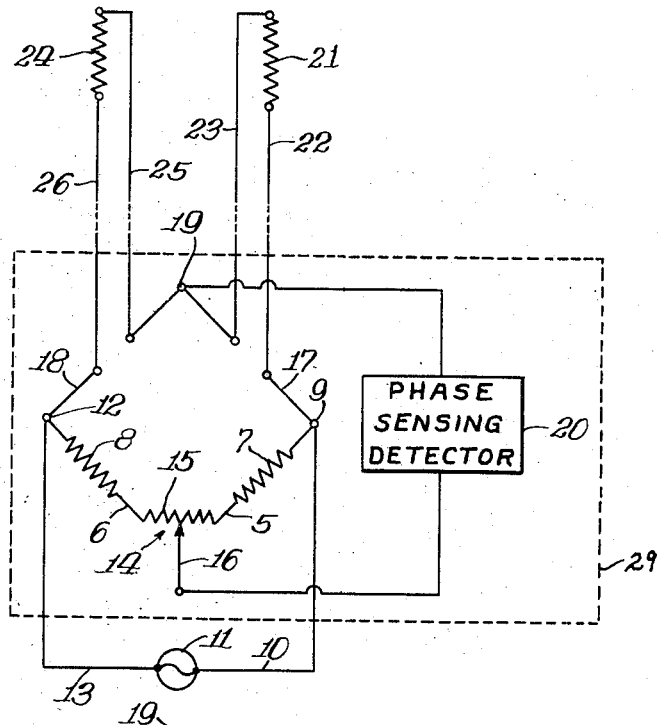
Fig. 1 is a diagrammatic illustration of a simple bridge circuit with a four-wire lead arrangement embodying the features of this invention.

Illustrated in the drawing, for purposes of disclosure, is a simple bridge circuit here shown as a temperature measuring circuit such as might be employed in measuring and controlling the temperature in a dwelling unit supplied with heat from a common and central heating plant and control station. The bridge circuit comprises a first arm 5 and a second arm 6, each having connected therein a fixed resistor 7 and 8, respectively, of appropriate value. One end of resistor 7 is connected to an input terminal 9, in turn connected by a lead 10 to an alternating current source 11. Similarly, one end of resistor 8 is connected to an input terminal 12, in turn connected by a lead 13 to an alternating current source 11. The remaining ends of the resistors 7 and 8 are connected to one another through a variable resistance, generally designated 14, composed of winding 15 and a movable contact or slider 16.

Completing the bridge proper are a third arm 17 and a fourth arm 18, each connected in well known manner at one end to the terminals 9 and 12, respectively, and being joined at their remaining end in a common terminal 19. Connected across the bridge from the terminal 19 to the movable contact 16 is a sensing device 20 herein shown as a phase sensing detector. The components of the bridge circuit thus far described are all located at the control station or operating center diagrammatically represented by the broken line outline 29.

Forming a part of arm 17 but located remotely from the operating center 29 is an element 21, responsive to some condition of the space to be heated. In this particular instance, this element is shown as a temperature responsive resistance, sometimes referred to as a resistance thermometer. It is connected in the bridge arm 17 by leads 22 and 23. Conventionally, bridge arm 18 includes a fixed resistor 24 located at and forming a part of the basic bridge circuit the same as resistors 7 and 8.

Obviously, with long leads 22 and 23 extending from the control station to the remotely located element 21, there is introduced into the bridge circuit unbalancing resistance, both when the current employed is direct current as well as when the current is alternating current. It has been customary to compensate or balance this added resistance by running an extra pair of leads generally parallel to, and co-extensive with, the leads 22 and 23, which extra pair of leads are, of course, connected in the arm 18 of the bridge. The extra pair of leads as distinguished from a resistor of comparable value is necessitated in order that the means employed to provide the compensating resistance may be subjected to the same conditions, such as changes in temperature and the like, to which the leads 22 and 23 are subjected and thus vary the added resistance accordingly. Where the bridge is operated on alternating current, two additional unbalancing factors are introduced by the existence of the long leads 22 and 23 and the resistance compensating leads which are conventionally added. One of these factors is the inductance effect of the circuit. At the comparatively low frequencies of conventional lighting or power circuits, this factor however is negligible, and can be forgotten. The other factor is the capacitance effect created by the inter-conductor or inter-lead capacity and the conductor-to-ground capacity.

In the past, this unbalancing factor due to the capacitance effect has been sought to be overcome and compensated for through the employment of a capacity balance adjustment, connected in the bridge circuit in a manner such that there could be variably incorporated in the bridge arm 18 a capacitance of a value to offset or compensate for a capacitance introduced by the leads 22 and 23. This mode of compensating for the unbalancing capacitance factor has several disadvantages. One of these is, of course, the added cost of the added elements composing the capacity balance. Another is the difficulty involved in adjusting the capacity balance to obtain a proper and accurate offsetting of the capacity effect of the leads. To make the proper setting of the capacity balance adjustment requires the coordinated manipulation of both the capacity balance adjustment and the resistance balance adjustment. Such coordinated manipulation requires such technical knowledge and skill not usually possessed by an electrician.

In the system herein disclosed this capacity compensation is effected in an extremely simple manner without the addition of electrical elements or devices other than those employed to effect resistance compensation. As is clearly seen from the drawing, this is accomplished by locating resistor 24 adjacent resistance thermometer 21 and connecting it by comparable leads 25 and 26 in arm 18 of the bridge. With this arrangement, leads 25 and 26 not only provide resistance balance, but the capacitance between the leads and between the leads and ground is the same as that in arm 17 of the bridge. Thus, capacity balance as well as resistance balance has been effected and this has moreover been accomplished without the need for electrical elements or components other than those conventionally employed for effecting resistance balance. Moreover, the compensation for capacitance unbalance is not merely of the same value but it is also of the same character in that the capacitance between the leads 25 and 26 is like the capacitance between leads 22 and 23, in effect connected in parallel with the resistance elements 24 and 21, respectively.

Figure 2:
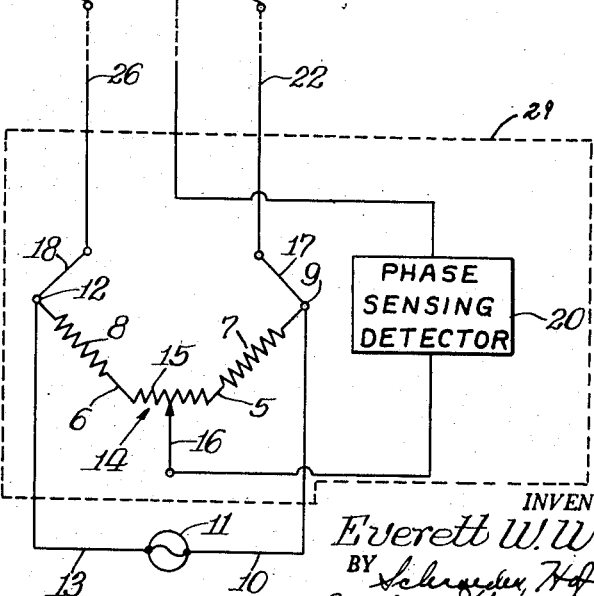
Fig. 2 is a diagrammatic illustration of a simple bridge circuit with a three-wire lead arrangement embodying the features of this invention.

In Figure 2, there is disclosed a slightly modified form of bridge circuit, resulting in a so-called three-lead circuit as distinguished from the four-wire or lead circuit disclosed in Figure 1. The circuit disclosed in Figure 2 is in all respects the same as that disclosed in Figure 1, save that the lead wires 23 and 25 are eliminated and terminal 19 connected more or less directly to the common ends of resistance thermometer 21 and the fixed resistor 24. Inasmuch as the circuit otherwise is the same, like reference characters have been applied to the components thereof and no additional description is believed necessary. In this modified form of circuit, a capacitance effect of the two arms 17 and 18 of the circuit remains balanced and again both resistance and capacitance unbalance is eliminated.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. An electrical bridge circuit comprising, in combination: a first pair of arms each having a resistor therein and connected to one another through the medium of an adjustable resistance; a source of alternating current connected across said arms; a second pair of arms having a common terminal and connected at the remaining ends to said alternating current source; a sensing device connected across the bridge from said common terminal to said adjustable resistance; a remotely located electrical element having a resistance factor and sensitive to and varying with a condition to be measured connected in one of said second pair of arms; a fixed resistor of substantially the same resistance value as said electrical element connected in the other of said second pair of arms and located adjacent said electrical element; and leads, connecting said electrical element and said fixed resistor in their respective bridge arms, extending parallel to and coextensive with one another.

2. An electrical bridge circuit comprising, in combination: a first pair of arms each having a resistor therein and connected to one another through the medium of an adjustable resistance; a source of alternating current connected across said arms; a second pair of arms having a common terminal and connected at the remaining ends to said alternating current source; a sensing device connected across the bridge from said common terminal to said adjustable resistance; a remotely located resistance element sensitive to a condition to be measured connected in one of said second pair of arms; a fixed resistor of substantially the same value as said resistance element connected in the other of said second pair of arms and located adjacent said condition sensitive resistance element; and leads, connecting said condition sensitive resistance element and said fixed resistor in their respective bridge arms, extending substantially parallel to and coextensive with one another.

3. An electrical bridge circuit comprising, in combination: a first pair of arms each having a resistor therein and connected to one another through the medium of an adjustable resistance; a source of alternating current connected across said arms; a second pair of arms having a common terminal and connected at the remaining ends to said alternating current source; a sensing device connected across the bridge from said common terminal to said adjustable resistance; a remotely located electrical element having a resistance factor and sensitive to and varying with a condition to be measured connected in one of said second pair of arms; a fixed resistor of substantially the same resistance value as said electrical element connected in the other of said second pair of arms and located adjacent said electrical element; a pair of leads connecting said electrical element in one of said second pair of arms; and a pair of leads connecting said fixed resistor in the other of said second pair of arms, said pairs of leads extending parallel to and coextensive with one another.

4. An electrical bridge circuit comprising, in combination: a first pair of arms interconnected by a variable impedance device adjustable to incorporate more or less impedance in the one or the other of said arms; a second pair of arms having a common terminal and connected at the remaining ends to the remaining ends of said first pair of arms; an alternating current source connected across said pairs of arms; a sensing device connected across the bridge from said common terminal to said variable impedance device; a remotely located impedance element having a resistance factor and sensitive to a condition to be measured connected in one of said second pair of arms; a fixed impedance element having a resistance factor of substantially the same value as said remotely located impedance element connected in the other of said second pair of arms and located adjacent said condition sensitive element; and leads connecting said condition sensitive element and said fixed impedance in their respective bridge arms, the leads of said second pair of arms having the same resistance and the same inter-conductor and conductor-to-ground capacitance.

5. An electrical bridge circuit comprising, in combination: a first and a second arm each having a resistor therein and connected to one another through a variable resistor; a source of alternating current potential connected to the free ends of said arms; a third arm comprising a remotely located resistance element sensitive to a condition to be measured and a lead extending from one end of said element to the juncture between one side of said alternating current source and said first arm; a fourth arm comprising a fixed resistor of substantially the same value as said resistance element located adjacent said condition sensitive resistance element and a lead connecting one end of said fixed resistor with the juncture of said alternating current source and said second arm, said last named lead extending parallel to and co-extensive with said first named lead, said condition sensitive resistance element and said fixed resistor being joined in a common terminal located adjacent thereto; and a sensing device connected between said last named terminal and said variable resistor.

References Cited in the file of this patent

UNITED STATES PATENTS

| | | |
|---|---|---|
| 1,665,397 | Wunsch | Apr. 10, 1928 |
| 2,393,669 | Wheaton et al. | Jan. 29, 1946 |
| 2,619,833 | Byrne et al. | Dec. 2, 1952 |